Sept. 28, 1954

N. B. DISMUKES 2,690,325

MACHINE FOR INCREASING THE SUBTERRANEAN
FLOW OF FLUID INTO AND FROM WELLS

Filed Sept. 2, 1948

INVENTOR.
Newton B. Dismukes

BY *Lancaster, Allen & Rommel*

ATTORNEYS.

Sept. 28, 1954 N. B. DISMUKES 2,690,325
MACHINE FOR INCREASING THE SUBTERRANEAN
FLOW OF FLUID INTO AND FROM WELLS
Filed Sept. 2, 1948 5 Sheets-Sheet 2

INVENTOR.
Newton B. Dismukes
BY
ATTORNEYS.

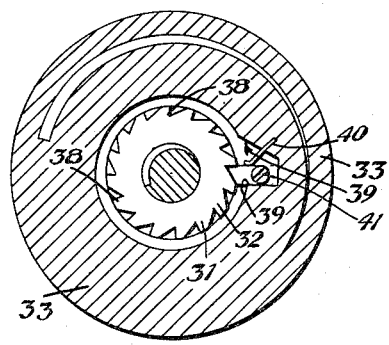
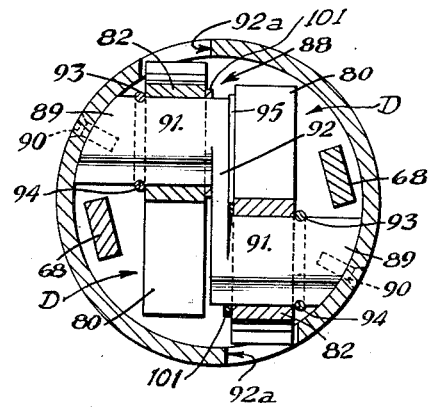
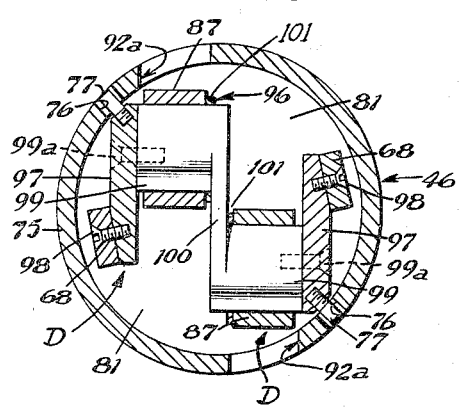
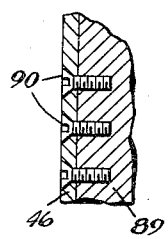
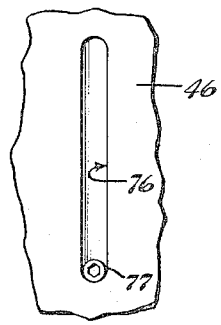

Sept. 28, 1954   N. B. DISMUKES   2,690,325
MACHINE FOR INCREASING THE SUBTERRANEAN
FLOW OF FLUID INTO AND FROM WELLS
Filed Sept. 2, 1948   5 Sheets-Sheet 4
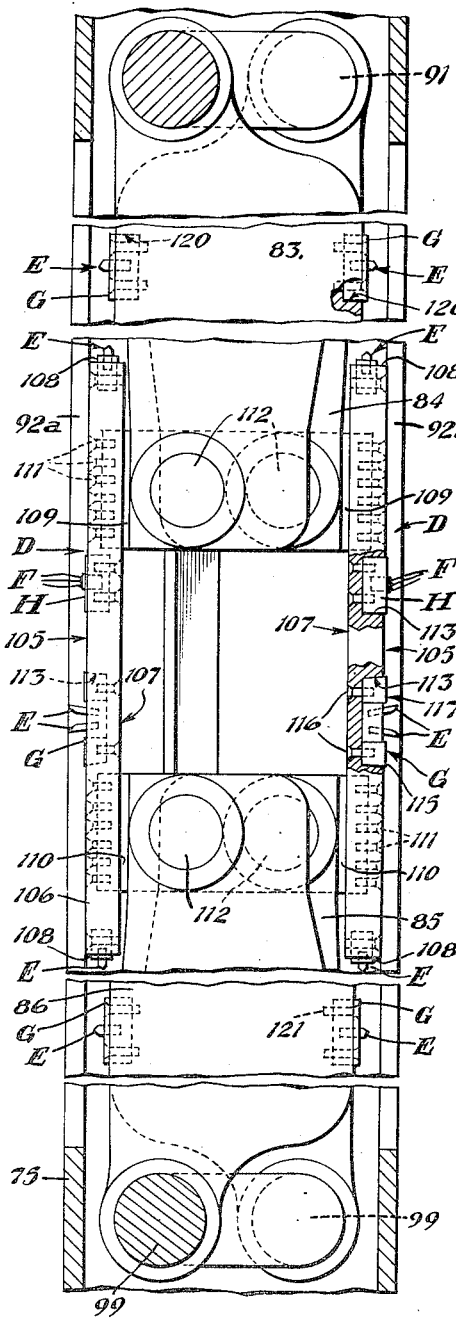
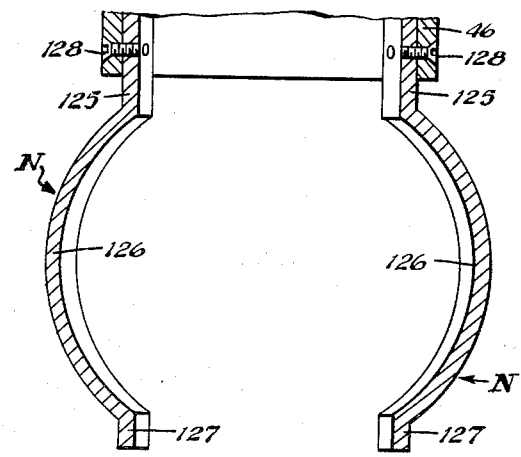
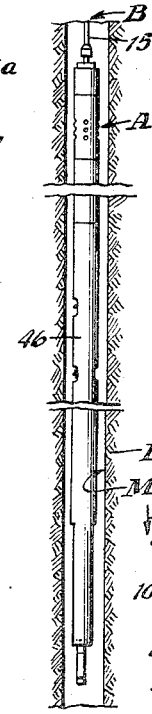
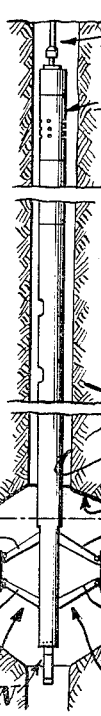
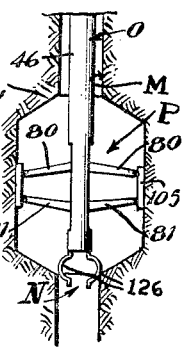
INVENTOR.
Newton B. Dismukes
BY
ATTORNEYS.

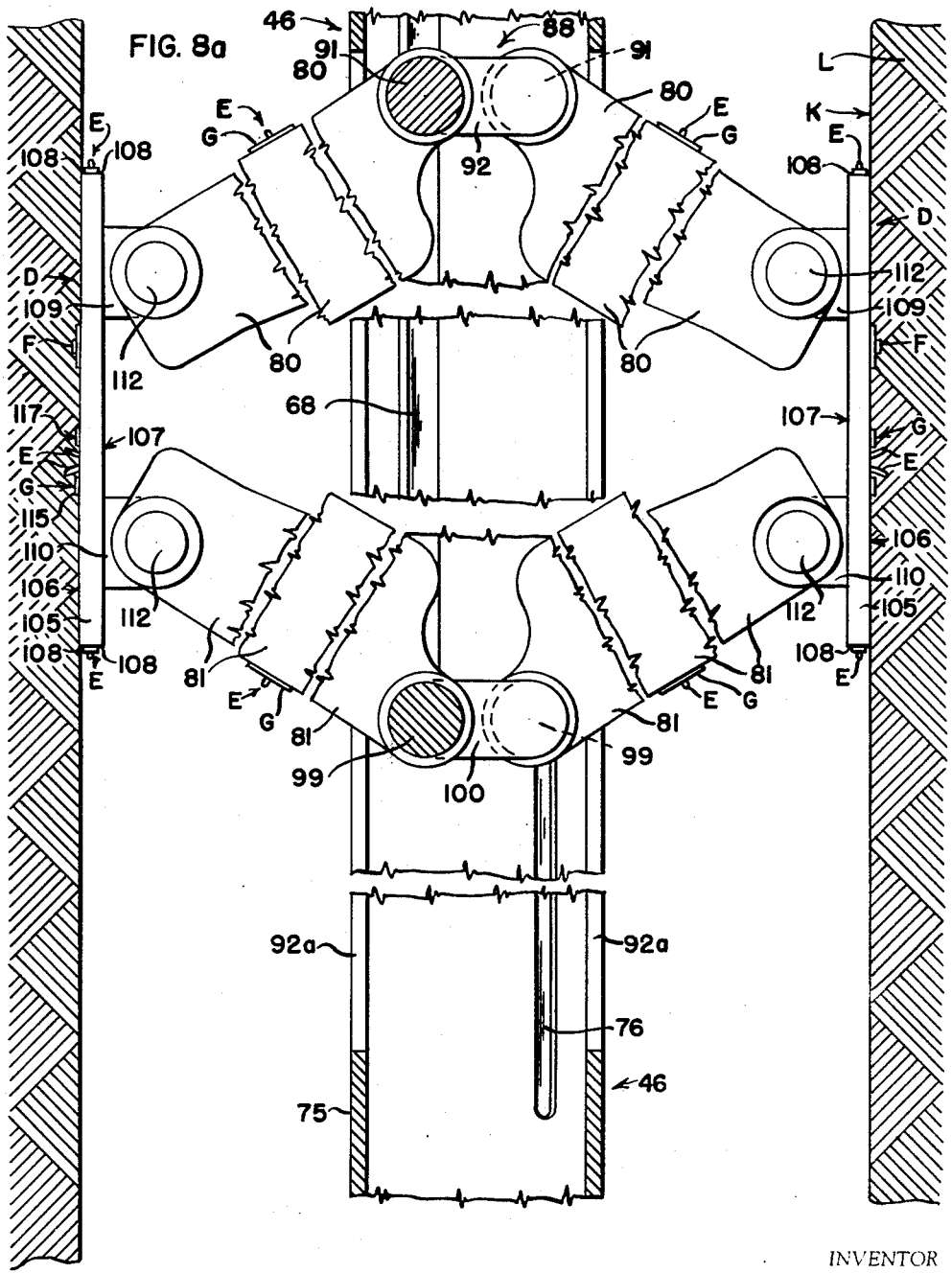

Patented Sept. 28, 1954

2,690,325

UNITED STATES PATENT OFFICE 2,690,325

MACHINE FOR INCREASING THE SUBTERRANEAN FLOW OF FLUID INTO AND FROM WELLS

Newton B. Dismukes, Tulsa, Okla.

Application September 2, 1948, Serial No. 47,364

6 Claims. (Cl. 255—76)

This invention relates to machines for increasing the subterranean flow of fluid into and from wells. An example of such machine is one for grooving passageways in the stratum surrounding an oil well bore, so as to provide channels or passageways extending from the bore, thru which the fluid within the stratum may flow. It also includes a method for cutting the passageways.

In a co-pending application, Serial Number 46,236, filed August 16, 1948, for Means and Methods for Increasing the Subterranean Flow Into and From Wells, I have illustrated and described machines for fracturing the stratum forming the walls of the well bores but, in the present disclosure, the machine disclosed is for forming, by expansion and reciprocation of the machine, well-defined passageways or channels extending from the well bore into the stratum surrounding the same.

An important object of the invention is to provide a machine for cutting such well-defined passageways or grooves rapidly and efficiently, with the lengths and depths of the same predetermined, as distinguished from fissures produced by splitting the stratum.

Another important object is to provide a machine for the purposes stated, which may be lowered into and removed from the well bore by employing conventional surface equipment, well known to workers in the oil drilling industry.

Still another important object is to provide a machine which does not employ exposed cutter-carrying chains, sprockets, complicated gearing or similar moving parts which are apt to become clogged by cuttings or the like. In fact, the machine herein disclosed does not include cutter-carrying chains, sprockets, complicated gearing nor similar moving parts at all.

A further major object is to provide toggle means to expand and contract the cutters, but this toggle means does not mount rotating parts, such as sprockets nor sprocket chains, the first of which are apt to become quickly damaged by the loss of teeth after use and the latter apt to elongate, vibrate and jump its associated sprockets, also soon after use. The toggle means herein disclosed includes sturdy toggle arms, with the cutters associated therewith fixed with respect to the arms, since the cutting action imparted to the cutters is due to lateral expansion of the toggle means with respect to the machine, and longitudinal reciprocation of the entire machine with respect to the well bore.

Yet another important object is to provide a machine well adapted to cut long grooves or passageways along the well bore since it is especially, but not limited to, association with modern surface apparatus capable of long strokes longitudinally of the well bore.

Because the operation of the machine does not depend upon a great volume of liquid (which would add greatly to the weight of the machine), the new machine may be run into and pulled from the well bore easily. In fact, the weight and volume of fluid employed for the actuation of the toggle arms is almost negligible.

There is no discharge of consequence of liquid from the machine into the well bore when the novel machine is being operated, hence there is no appreciable wetting of the stratum nor is there ejected liquid tending to force solids into the pores of the stratum, which would be detrimental to oil flow.

A further important object is to provide a method for increasing the depth of passageways cut into the stratum surrounding a well bore.

Other objects and advantages of the invention will be apparent during the course of the following detailed description of the invention, taken in connection with the accompanying drawings, forming a part of this disclosure, and in which drawings:

Figure 5 is a horizontal section, substantially on the line 5—5 of Figure 1.

Figures 6 and 7 are horizontal sections substantially on their respective lines of Figure 4.

Figure 8 is a view, mostly in elevation, of the toggle means of Figure 4 in a retracted position.

Figure 8a is a view partly in elevation, of the toggle means of Figure 8 in extended position.

Figure 9 is a fragmentary elevation of the lower part of a housing for the toggle means.

Figure 10 is a fragmentary vertical section of portions of the structure shown in Figure 6.

Figure 11 is a fragmentary vertical section of portions of the structure shown in Figure 7.

Figure 12 is an elevation of the new machine lowered into a well bore and in a position for the initial extension of the toggle arms.

Figure 13 is a like view, but of the toggle arms extended and illustrating the condition of the well bore and surrounding stratum after reciprocation of the machine.

Figure 14 is a horizontal section of the well bore substantially on the line 14—14 of Figure 13.

Figure 15 is a view somewhat like Figure 13 but showing the step of enlarging the passageways of that figure and Figure 14.

Figure 16 is an elevation of support and orienting means for the machine.

Figure 1:
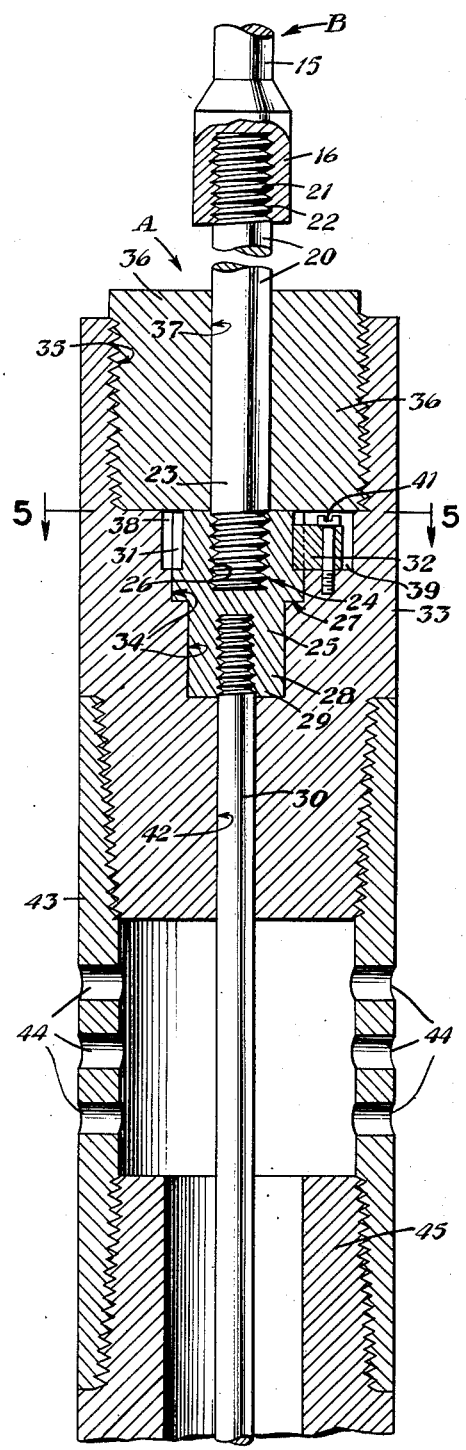
Figure 1 is a view mostly in vertical section of the uppermost portion of the novel machine, with fragments of a rotating and reciprocating means associated therewith.

In the drawings, wherein for the purpose of illustration is shown a preferred embodiment of the invention and wherein similar reference characters designate corresponding parts thruout the several views, the letter A designates the novel machine as a whole adapted to be reciprocated as a whole by suitable means B, and which machine A includes means C to effect expansion of the toggle means D in order to position cutters E or F carried by cutter holders G or H, as the case may be, in positions for cutting grooves or passageways K in the stratum L of the well bore M. There is also provided means N to prevent rotation of the machine, and in order to carry out the method herein disclosed an additional machine or machines O, having toggle means P, much like the machine A may be provided.

Any suitable means B may be employed for reciprocation of the machine A. For example, conventional equipment may be employed, such as described and illustrated in "Oil Field Exploitation" by Lester Charles Uren, McGraw-Hill Book Company, New York, 2nd edition, second impression, 1939, chapter IV. Especially useful for the purpose is a pneumatic pumping cylinder, as described on page 307 of that publication. This means B includes, of course, a rotatable and vertically reciprocable member 15 adapted to extend into the well bore.

Figure 2:
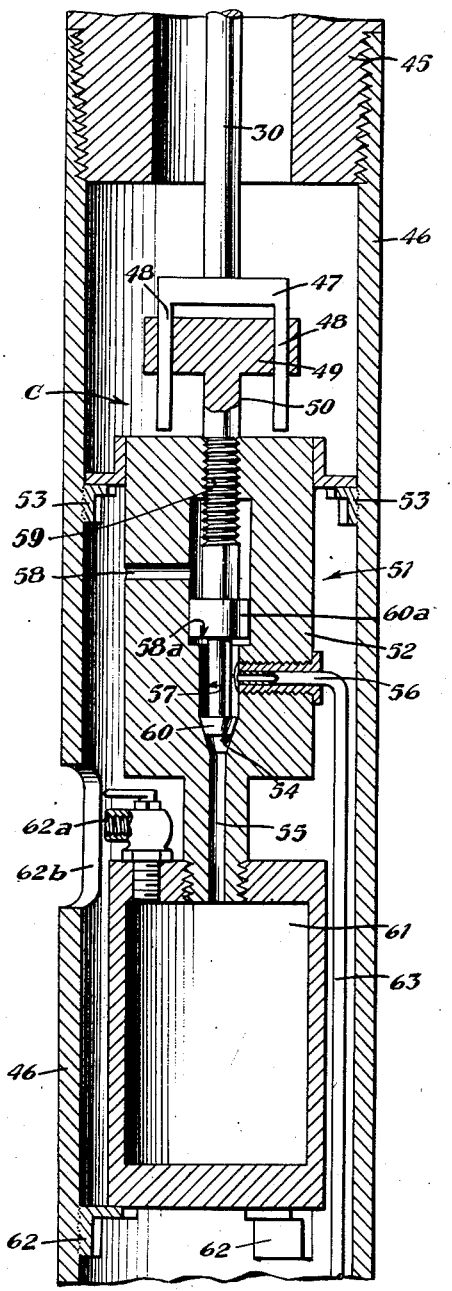
Figure 2 is a view, almost wholly in vertical section of the structure next below that of Figure 1.
Figure 3:
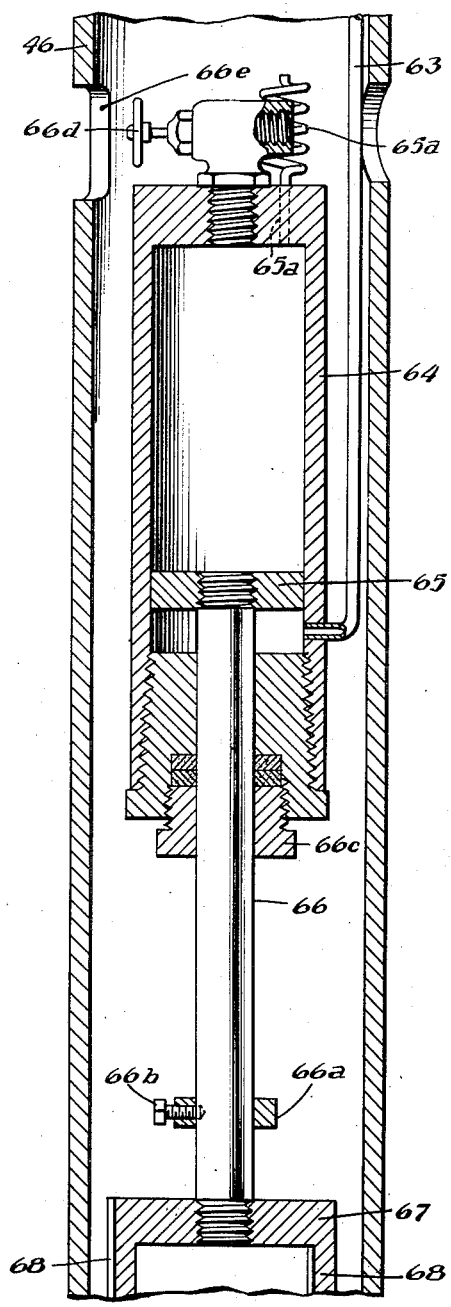
Figure 3 is a view, mostly in vertical section of a portion of the new machine next below that of Figure 2.
Figure 4:
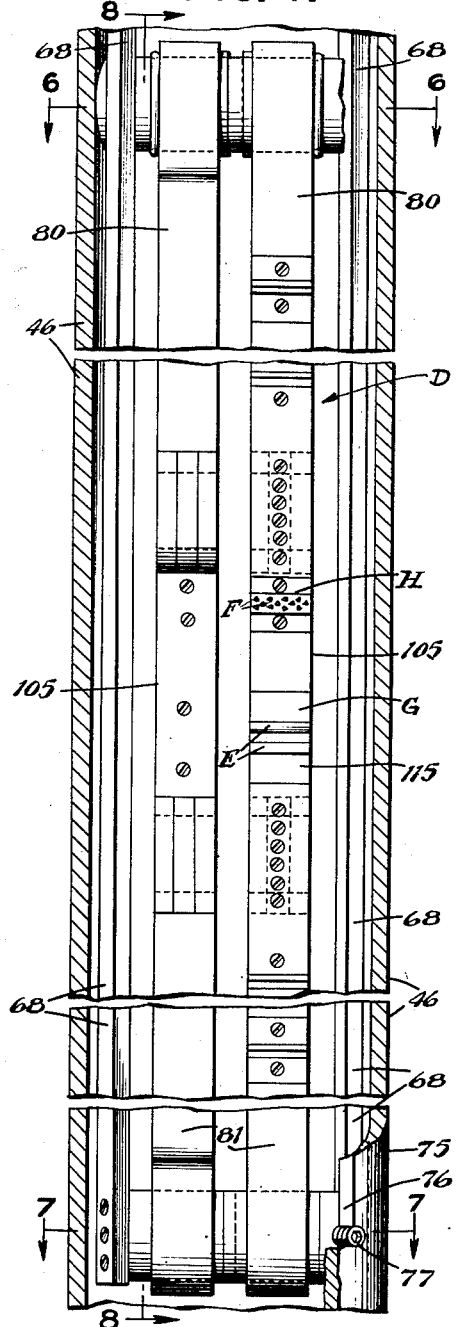
Figure 4 is a view partly in vertical section of a portion of the novel machine next below that of Figure 3 and showing the toggle means of the new machine.

The means C to effect expansion of the toggle means D may take various forms but for the purpose of disclosing an operative structure, there is illustrated and described the apparatus shown particularly in Figures 1 to 5 inclusive, and which includes an elongated substantially rigid member 20 suitably operatively connected at the upper end portion 21, as by screw threads 22 thereon, with the member 15 which may be provided with a screw threaded socket 16 to receive and detachably retain the screw threaded end portion 21. The lower end portion 23 of the member 20 is provided with means 24 to detachably couple it to a rotatable, inner head 25, which may be cylindrical and provided with a screw threaded, upwardly-opening socket 26 to receive the end portion 23. The head 25, intermediate its length, is preferably provided with a downwardly-facing shoulder 27 since the lower portion 28 of the head is reduced in circumference and this lower portion may be provided with a portion of means 29 to detachably couple the head to a valve-manipulating member 30, which portion of the means 29 may be an elongated rod. To the head 25 is secured a suitable ratchet part, as the ratchet ring 31, to turn with the head 25 and with its teeth engaged by a pawl or clink 32, mounted as will be subsequently described.

The inner head 25 is received in an outer non-rotating head 33 which is provided with a socket 34 intermediate its length to receive the head 25. The head 33 has an opening 35 from its upper end leading to the socket 34 and this opening receives a closure 36. The closure 36 and head 33 may be detachably connected as by interior screw threads carried by the head 33 at the opening 35 and exterior screw threads of the closure 36. The closure 36 has a central bore 37 to slidably and rotatably receive a part of the lower end portion 23 of the member 20 above the screw threads of the portion 23. While the closure 36 prevents the inner head 25 from accidentally sliding out of the outer head 33, it does not bear upon the former so as to prevent rotation of the head 25.

Of course, the head 33 is provided with a recess 38 to receive the ratchet ring 31 and this recess is enlarged at one point to provide a sub-recess 39, as shown in Fig. 5, to accommodate the pawl 32 for movement thereof, as well as to accommodate a resilient means, as a leaf spring 40 as also shown in Fig. 5, to resiliently urge the pawl 32 (which is, of course, pivoted as at 41 to the head 33) to releasably engage the teeth of the ring 31. As may be appreciated, from Figure 5, clockwise movement of the ring 31 is prevented, but step-by-step counter-clockwise rotation thereof is permitted.

The outer head 33 is provided with a bore 42 from the axial center of the socket 34 to the bottom face of the head 33, and this bore receives, for rotation, the upper portion of the valve-manipulating member 30 below the connection thereof with the head 25. The outer head is provided with suitable means to detachably couple it to a hollow fitting 43 preferably so as to provide a tapered (pin) joint and this fitting 43 may be provided with a plurality of lateral fluid passageways 44, and the fitting is, in turn coupled to the upper end of an elongated hollow member 45 which may be made up of conventional drill collars, having a total length of substantially one hundred feet, for example, so as to cause the machine to descend, despite the frictional drag of the cutters on the walls of the well bore M.

Coupled to the lower end portion of the hollow member 45 thru which member extends the valve-manipulating member 30, is a main housing 46. This housing may be an elongated metallic tube, into the upper end portion of which the lower end portion of the valve-manipulating member 30 extends and which member 30 terminates in a yoke 47 including a pair of downwardly-extending parallel spaced apart arms 48 slidably receiving a head 49, provided with perforations to receive the arms 48. The head 49 is disposed at the upper end of a valve stem 50 of a valve means 51 which includes a valve housing 52 supported in any approved way within and to the main housing 46, as by brackets 53. The housing contains a suitable valve seat 54, a fluid passageway 55 preferably opening into the bottom of the seat 54, a fluid passageway 56 opening into the valve passageway 57 above the seat, and a vent 58 opening into the valve passageway 57, such as above the mouth of the passageway 56. The upper end portion of the pasageway 57 is enlarged in diameter, forming a shoulder or seat 58ᵃ. The valve stem 50 is preferably screw threaded intermediate its length to cooperate with the screw threads of a stem-receiving bore 59 in the upper end wall of the valve housing 52, and the stem is provided with a valve 60 at its end, to seat upon the seat 54, and a valve 60a to seat upon the seat 58a. This valve 60a has a diameter so slightly less than the diameter of the passageway 57 above the seat 58a that it prevents the escape of fluid into the upper, enlarged portion of the passageway 57 and out the vent 58 until the valve stem 50 has made a predetermined number of turns.

From the foregoing, it is apparent that rotation of the valve-manipulating member 39, in one direction will cause unseating of the valve 60 at the lower end of the stem 50 since the stem 50 may both rotate and rise because the arms 48 and the head 49 may slide relative to each other and the arms will, of course, at the same time, impart rotative movement to the head.

The passageway 55 opens into the pressure fluid supply which may be contained in a reservoir 61 which is preferably disposed within the main housing 46 below the valve means 51 and suitably supported by any approved means as brackets 62. A valved coupling 62a, mounted upon the reservoir 61 and opening thereinto, may be provided in order to permit charging of the reservoir. The housing 46 may be provided with a hand hole 62b so as to manipulate the valve. Preferably the fluid within the reservoir 61 is an inert gas such as carbon dioxide or nitrogen but may be a liquid, such as liquefied ammonia.

The passageway 56 extends, as a conduit 63, to open into a cylinder 64 at one side (the lower side, preferably) of a piston 65 which is contained and slidable therein. This cylinder at the other side of the piston, holds a suitable pressure fluid, preferably a heavy lubricating oil or glycerine and, for reasons later explained, I provide a bleed or weep means 65a, preferably a capillary tube of spiral shape, extending from the chamber of the cylinder 64 to exteriorly thereof and, of course, at the end portion of the cylinder normally farthest from the piston. Means to adjustably limit the length of travel of the piston rod 66 is preferably provided and comprises an abutment 66a which may be a ring surrounding a portion of the rod 66 and slidable therealong but retained in adjusted positions, as by means of the set screw 66b. Of course the upward movement of the rod 66 is stopped when the abutment contacts the lower face of the conventional gland 66c for the cylinder 64. In order to permit charging of the cylinder 64, a valved coupling 66d similar to the coupling 62a may be provided, opening into the cylinder chamber, as well as an adjacent hand hole 66e provided in the housing 46.

The lower end of the piston rod or plunger 66 terminates in a crosshead 67 carrying a pair of depending, elongated members 68, such as stout, rigid straps or bars operatively connected with the toggle means D.

The toggle means D, shown particularly in Figures 4, 6, 7, and 8, is associated with the lower portion 75 of the main housing 46, which lower portion is provided with a pair of slots 76 preferably spaced above the bottom edge of the portion 75 and are disposed substantially 180° apart. They slidably receive guide pins 77 which project outwardly from the lowermost portions of the members 68 and the pins may be removably secured to the members 68 as by screwing thereinto. These pins 77 are provided to retain the toggle means, particularly the toggle arms in their correct positions with respect to openings in the housing 46 to be subsequently described.

There are provided toggle arms 80 and 81, preferably substantially alike but the upper toggle arms 80 each comprise a housing-pivoted or upper end portion 82, an intermediate body portion 83 and a cutter assembly-pivoted or lower end portion 84, while each of the lower toggle arms 81 comprise a cutter assembly-pivoted or upper end portion 85, an intermediate body portion 86 and a strap-pivoted or lower end portion 87. The portions 82 and 87 are, preferably, enlarged, as may be seen in the drawings, so as to provide strength at the several pivotal connections.

Each upper end portion 82 is swingably mounted for pivoting about an upper support structure 88, which comprises two outer portions 89 for attachment to opposite sides of the inner face of the housing 46 as by screws 90 (shown in Figure 10), a pair of intermediate spindle portions 91, on which the two toggle arms 80 swing at their upper end portions 82, and a central portion 92 connecting the portions 91. As may be seen in Figure 6, one arm 80 is disposed to one side of the transverse axis of the housing 46 and the other to the other side thereof and, consequently, the housing is slotted as at 92a to permit emergence and retraction of the arms 80 (as well as of the associated arms 81). In order to prevent undesired movements of the arms 80 longitudinally of their spindle portion 91, snap rings 93 may be provided, adapted to snap into grooves 94 and the spindle portion 91 to limit longitudinal movement of the arms in one direction, and suitable spacers 95 to space them from the central portion 91.

Each lower end portion 87 of the toggle arms 81 is swingably mounted for pivotal movement about a lower support structure 96, somewhat like the structure 88, which comprises two outer portions 97 for attachment to the inner faces of the members 68 as by screws 98, a pair of intermediate spindle portions 99 on which the two toggle arms 81 swing at their lower end portions 87 and which may be detachably secured to the portion 68 as by screws 99a, and a central portion 100 connecting the portions 99. What has been said as to the disposition of the arms 80 applies to the arms 81, as is obvious by comparing Figures 6 and 7. Suitable means, as spacers 101 may be employed to position the arm portions 87 upon the respective spindle portions 99.

Referring now to the cutter carriers' support means, the same comprises a pair of members 105 each of which may be a bar having an outer face 106, inner face 107 and end faces 108. Extending from the inner face 107 of each member 105 is a pair of spaced-apart perforated ears 109 and 110 which may be secured to their respective members 105 as by screws 111. The ears 109 are pivotally carried by the toggle arms 80 and the ears 110 by the arms 81 by the use of suitable pivot pins 112. Thus, the members 105 are rockably supported by the toggle arms, as distinguished from being rotatably supported.

It is preferred to provide the members 105 with detachable cutter carriers or holders G and H and, for that reason, the members 105 may be recessed as at 113 and 113a at their outer faces 106 and end faces 108.

Examples of suitable cutter carriers or holders G and H are shown in Figure 8 and the carrier G comprises a body portion 115 adapted to fit into a recess 113 and secured therein, as by screws 116. Each body portion 115 has an outer face 117 which may project slightly above the plane of the outer face 106 of a member 105 and from this outer face 117 projects a suitable cutter or tooth E, with its inner ends embedded within the cutter holder G. The cutter holders H are substantially like the holders G but support plural cutters F. If desired, the toggle arms 80 and 81 may be suitably recessed as 120 in their well bore-facing faces, to receive cutter holders G carrying cutters E, which cutter holders may be secured to the respective arms 80 and 81 as by screws 121.

In order to provide means N for preventing bodily rotation of the machine, I disclose a means which comprises resilient members (preferably two) each having an upper, housing-attachable portion 125, an outwardly bowed portion 126 extending therefrom and a downwardly-extending free end portion 127. The resilient members are preferably secured to the lower end 75 of the housing 46 as by screws 128 and disposed substantially 180° apart with their longitudinal axes disposed substantially 90° from the center of adjacent slots 92. One use of the means N is to prevent bodily rotation of the machine A when the valve means 51 is being manipulated. An additional function for the means N will be subsequently described.

In the operation of the novel apparatus A, after the valve means 51, is in a closed position and the reservoir 61 and cylinder 64 suitably charged (at which time the toggle arms are retracted), the machine A may be lowered into the well bore to a predetermined position therein. The valve is then opened to the extent of permitting fluid flow from the reservoir 61 thru the passageway 55, valve means 51, passageway 63 and into the cylinder 64. At this time, the passageway 57 is closed to the vent 58. Pressure fluid entering the cylinder 64 will cause upward movement of the piston 65 and its rod 66 which will, in turn, cause outward pivoting of the toggle arms 80 and 81; since the lower arms 81 are operatively connected with the piston rod 66. The position of the abutment 66ª will, of course, limit outward movement of the toggle arms. During the time the piston 65 is moving upwardly, the fluid within the cylinder is bleeding therefrom, thru the tube 65ª.

The cutters E and F carried by the members 105 are now engaging the wall of the well bore M and vertical reciprocation of the machine A may now commence and continue until the passageways K are cut into the stratum L to the depth desired. (This may be the total depth desired or the partial depth as will be subsequently explained.) The toggle arms may be retracted after reciprocation of the machine A is stopped whereupon the valve means 51 is further manipulated (continue turning the valve stem 50 until the valve 60ª clears the vent 58) whereupon the pressure fluid may be discharged therethru and this will release pressure against the piston so that the latter will descend, urged by the weight of the structure wholly or partly supported by it (toggle arms 80 and 81, piston rod 66, crosshead 67 and depending members 69) and the machine A may now be withdrawn from the bore for recharging.

Since the reciprocable connection of the toggle arms is at their lower end portions, rather than at their upper portions, collapsing of the toggle is facilitated because the effects of the force of gravity may be employed to assist collapsing and, when the machine is being withdrawn the arms will readily collapse against the walls of the passageways since the upper arms 80 may readily pivot downwardly, as distinguished from upper arms carrying a reciprocating means which would resist collapsing.

It is pointed out that the tube 65ª permits the discharge of fluid so that there will not only be a relatively slow but steady expansion of the toggle arms to advance the cutters as they cut, but it also prevents sudden (and what might prove to be damaging) outward movements of the toggle arms in the event the arms encountered a cavity.

The cutters E carried by the toggle arms 80 and 81 are provided to cut the stratum L at the extreme upper and lower limits of each reciprocation of the machine A since, otherwise, each successive stroke would need to be shortened.

Upon orienting the machine A so that the two resilient members of the means N are disposed 90° from their initial positions while in the well bore, and lowering the machine A, the bowed portions 126 will spring into the previously cut passageways and hold the machine against rotation, as two additional passageways, spaced 90° from the first passageways, are cut.

Of course, it will be necessary to run a bailer into the bore to remove the cutting, as is well known in the industry.

After a pair of passageways K are cut into the stratum L as described, it is desirable, in some cases, to enlarge the depths of the two passageways and the problems encountered in attempting to do so are difficult to solve. For example, the passageways are below ground, out of sight, and it is necessary to insert a cutting means so that portions of it will enter the passageways in order to enlarge them. This requires a machine or machines O, much like the machines A since the only differences are that the machines O have longer toggle arms, supports therefor and operative connections with the piston 65 and that the means N be positioned, as shown in Figure 15.

Upon lowering the machine O into the well bore M to the original level, the entire tool is next rotated in one direction (counterclockwise), since this is possible because of the ratchet means described, until the outwardly bowed portions 126 of the means N (which have been in contact with the wall of the well bore) spring outwardly into the previously cut passageways and the resistance encountered above ground to further rotation will apprise the operator that the portions 126 are within the passageways, and further rotation is stopped. The longer toggle means P of the machine O is then expanded and when the cutters engage the inner ends of the passageways, reciprocation of the machine O may take place (altho reciprocation may be started sooner). The machine O will, of course, enlarge the passageways by deepening them as is now obvious.

What is claimed is:

1. In a well bore slotter, a support; a body below the ground surface of the stratum surrounding the well bore and secured to said support; an arm movably connected with the body; a cutter operatively connected with said arm; means to move said arm outwardly from said body with said cutter in contact with the walls of said stratum including a chamber within said body, fluid under pressure in said chamber, a pressure fluid cylinder operatively connected with said chamber, and a piston in the cylinder and operatively connected with said arm to force said cutter into cutting contact with said stratum, valve means carried by said body to release said fluid under pressure from said chamber into said cylinder to move said piston, and means extending to said ground surface to operate said valve means.

2. In a well bore slotter, a support; a body below the ground surface of the stratum surrounding the well bore and secured to said support; an arm movably connected with the body; a cutter operatively connected with said arm; means to move said arm outwardly from said body with said cutter in cutting contact with said stratum and to retract said arm; means to reciprocate said cutter for said cutter to cut a slot; and means to direct said cutter, when said arm is retracted and while said cutter is within said well bore, into a position to cut a second slot spaced from the first slot including a resilient bowed portion carried by said body and constructed and arranged to spring into the first slot.

3. In a well bore slotter confined to reciprocatory slotting, a body, an arm operatively carried by said body, a cutter carried by the arm; fluid pressure means for selectively extending and retracting said arm to cause said cutter to contact and move away respectively from the wall of a well bore, including fluid under pressure in said body, a cylinder and a piston in the cylinder; support means for supporting and maintaining said body in spaced relationship with the mouth of said well bore including a support; valve means carried by said body and operated upon rotation of said support to admit said fluid under pressure to said cylinder back of said piston and means for preventing rotation of said body upon said rotation of said support.

4. The steps on the method of progressively increasing the subterranean flow capacity of a well bore which consist in providing a cutter and a guide, lowering said cutter and guide into said well bore, advancing said cutter into contact with the stratum surrounding said well bore, cutting an initial substantially vertical passageway extending from said well bore into said stratum to the limit of advancement of said cutter, withdrawing said cutter from said initial passageway and said well bore, lowering a second cutter and guide into said well bore, moving said second-named cutter and guide until said second-named guide enters a portion of said initial passageway, advancing the second-named cutter, from below ground, into another portion of said initial passageway and enlarging said initial passageway beyond said limit.

5. The steps in the method of progressively increasing the subterranean flow capacity of a well bore which consist of providing a guide and a cutter, lowering said cutter and said guide into a well bore, causing said guide to resist rotation of said cutter, advancing said cutter into contact with the stratum surrounding said well bore, forming, with said cutter, an initial passageway in said stratum substantially parallel to said well bore, removing said cutter and guide from said initial passageway, rotating said cutter substantially 90 degrees in said well bore until said guide enters the initially-formed passageway and forming with said cutter, a passageway extending from said well bore into the stratum surrounding said well bore at an angle from said initial passageway.

6. The steps in the method of progressively increasing the subterranean flow capacity of a well bore which consists of providing a guide and a cutter, lowering said cutter and said guide into a well bore, causing said guide to resist rotation of said cutter, advancing said cutter into contact with the stratum surrounding said well bore, forming, with said cutter, an initial passageway into said stratum essentially parallel to said well bore, withdrawing said cutter and guide from said well bore; providing a second guide and a second cutter, lowering the second guide and cutter into said well bore, rotating said second cutter, against the resistance of said second guide, in said well bore until said second guide enters said initial passageway, and forming, with said second cutter a passageway extending from said well bore into said surrounding stratum at an angle from said initial passageway.

References Cited in the file of this patent

UNITED STATES PATENTS

| Number | Name | Date |
|---|---|---|
| 1,257,561 | Weber | Feb. 26, 1918 |
| 1,317,192 | Jones | Sept. 30, 1919 |
| 1,647,670 | Sipe | Nov. 1, 1927 |
| 1,764,373 | Wells et al. | June 17, 1930 |
| 1,779,643 | Schwiers, Jr. | Oct. 28, 1930 |
| 1,828,605 | Humphreys | Oct. 20, 1931 |
| 1,829,760 | Santiago | Nov. 3, 1931 |
| 1,839,767 | Lopez | Jan. 5, 1932 |
| 1,868,702 | Granville | July 26, 1932 |
| 1,970,063 | Steinman | Aug. 14, 1934 |
| 2,060,352 | Stokes | Nov. 10, 1936 |
| 2,169,502 | Santiago | Aug. 15, 1939 |
| 2,178,553 | Bowie | Nov. 7, 1939 |
| 2,178,554 | Bowie | Nov. 7, 1939 |
| 2,218,155 | Rusler et al. | Oct. 15, 1940 |
| 2,324,956 | Sewell | July 20, 1943 |
| 2,450,223 | Barbour | Sept. 28, 1948 |

FOREIGN PATENTS

| Number | Country | Date |
|---|---|---|
| 257,338 | Italy | of 1928 |